United States Patent [19]

Shoji et al.

[11] Patent Number: 4,559,577
[45] Date of Patent: Dec. 17, 1985

[54] DRILLING MACHINE

[75] Inventors: Michihiro Shoji; Toshio Mikiya, both of Tokyo, Japan

[73] Assignee: Nitto Kohki Co., Ltd., Tokyo, Japan

[21] Appl. No.: 482,247

[22] Filed: Apr. 5, 1983

[30] Foreign Application Priority Data

Apr. 5, 1982 [JP] Japan ................... 57-56305

[51] Int. Cl.$^4$ ................... H02H 7/085; B23B 47/24
[52] U.S. Cl. ................... 361/31; 318/434; 340/648; 340/664; 340/680; 361/24; 361/96; 408/6; 408/9; 408/16
[58] Field of Search ................... 408/5, 6, 8, 9, 10, 408/11, 16, 17; 318/434; 361/31, 96, 23, 24; 340/648, 664, 679, 680

[56] References Cited

U.S. PATENT DOCUMENTS

| | | | |
|---|---|---|---|
| 3,248,629 | 4/1966 | Reynolds | 318/434 |
| 3,259,023 | 7/1966 | Rieger et al. | 408/9 |
| 3,516,327 | 6/1970 | Wilson | 408/8 |
| 3,545,310 | 12/1970 | Porath et al. | 408/11 |
| 3,809,985 | 5/1974 | Krause et al. | 361/31 |
| 3,845,373 | 10/1974 | Totsu et al. | 361/31 |
| 4,240,072 | 12/1980 | Fowler | 361/31 |

FOREIGN PATENT DOCUMENTS

1520171  8/1978  United Kingdom ................... 408/8

Primary Examiner—Gil Weidenfeld
Assistant Examiner—Daniel W. Howell
Attorney, Agent, or Firm—Birch, Stewart, Kolasch & Birch

[57] ABSTRACT

A drilling machine including an electric drill being selectively fixed at a desired angle with respect to a workpiece and a manual feed handle for moving the electric drill toward and away from the workpiece. A control circuit for the electric drill is provided having a sensor member being operatively connected in said control circuit for detecting a load applied on the electric drill. An alarm member is operatively connected in the control circuit for sending out a signal when a load signal exceeding a first reference level is detected. A switch is operatively connected in the control circuit for deenergizing said control circuit for the electric drill when a load signal exceeding a second reference level is detected.

5 Claims, 3 Drawing Figures

DRILLING MACHINE

BACKGROUND OF THE INVENTION

In a drilling machine including an electric drill with a positioning member for fixing it to a workpiece, such as an electromagnetic base, and a front member, for instance, an annular cutter, there is a larger torque as compared with a drilling machine having a twist drill. Consequently, when an abnormally increased load is applied on the annular cutter, breakage of the cutting edge or burning-out of the motor for driving the electric drill may occur. Thus, the operator has to handle such a drilling machine while paying constant attention so as to prevent a larger load from being applied on the annular cutter. However, difficulties are still encountered in reducing the occurrence of such breakage or burning-out of the motor, since visual identification of loading demands sophisticated skill. In this respect a great deal of room is left for improvement. To add to this, drilling should be shut off immediately upon the completion of the drilling step to prevent breakage of the annular cutter and to save power. A great deal is left to be desired in this regard.

SUMMARY AND OBJECT OF THE INVENTION

In view of the fact that skill is more or less required for the handling of a drilling machine having, for example, an annular cutter, an object of the present invention is to provide a drilling machine which is easy for even beginners to handle, can be used with no risk of any breakage and burning-out of a drill-driving motor, and contributes to a savings in power.

According to the present invention, sensor means are provided for detecting a load on the drill-driving motor that is variable in response to a change in cutting resistance. Upon detection of a load exceeding a first reference level, the sensor means sends out an alarm to notify the operator of the interruption of drilling. Upon detection of a load exceeding a second reference level, the sensor means sends out another alarm, in response to which the drill-driving motor will automatically be shut off, thereby reducing the load applied to the electric drill and preventing burning-out of the motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
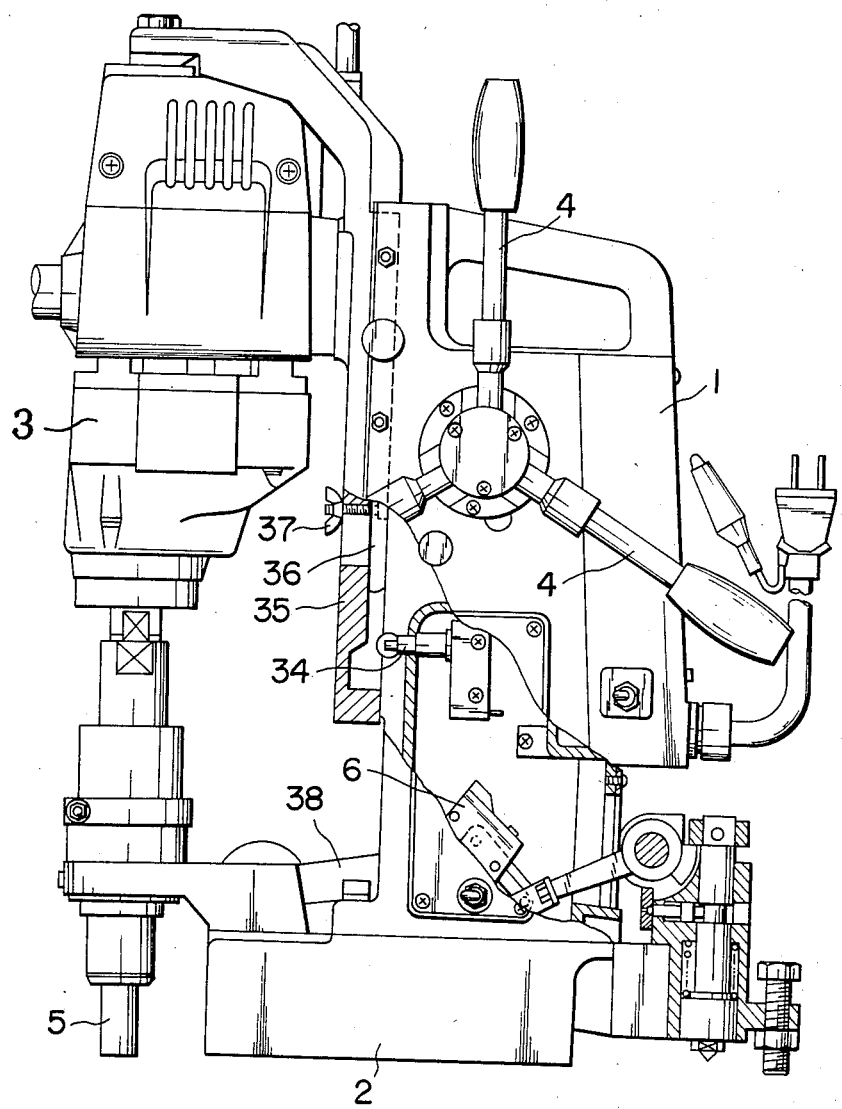
FIG. 1 is a right side view showing one embodiment of the present invention.

The present invention will be explained in detail with reference to one preferred embodiment illustrated in the drawings.

FIG. 1 shows the right side of the inventive drilling machine with a built-in control circuit forming part of the present invention, which includes a frame 1, electromagnetic base 2 attached to the lower portion of the frame 1, and an electric drill 3 mounted on the front portion of the frame 1. The electric drill 3 is mounted to be vertically movable by manipulation of a manual handle 4, and an annular cutter 5 is attached to the arbor of the drill 3.

Figure 2:
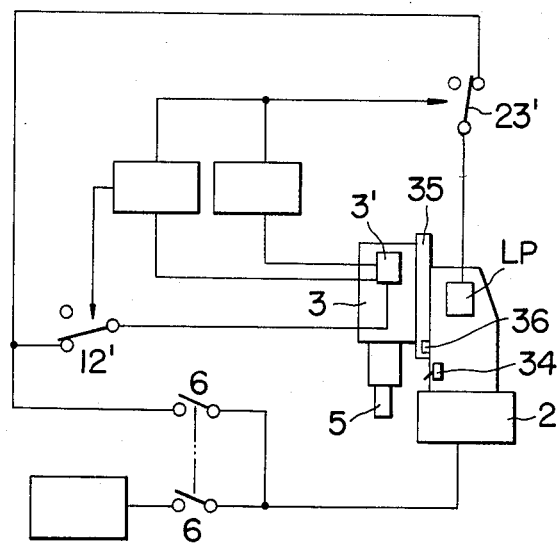
FIG. 2 is a block diagram showing the protection circuit.

FIG. 2 is a block diagram showing a protection circuit. The control circuit for the electric drill 3 includes sensor means for detecting a load impressed on the electric drill 3 as a function of a voltage change and an ON-OFF circuit.

Figure 3:
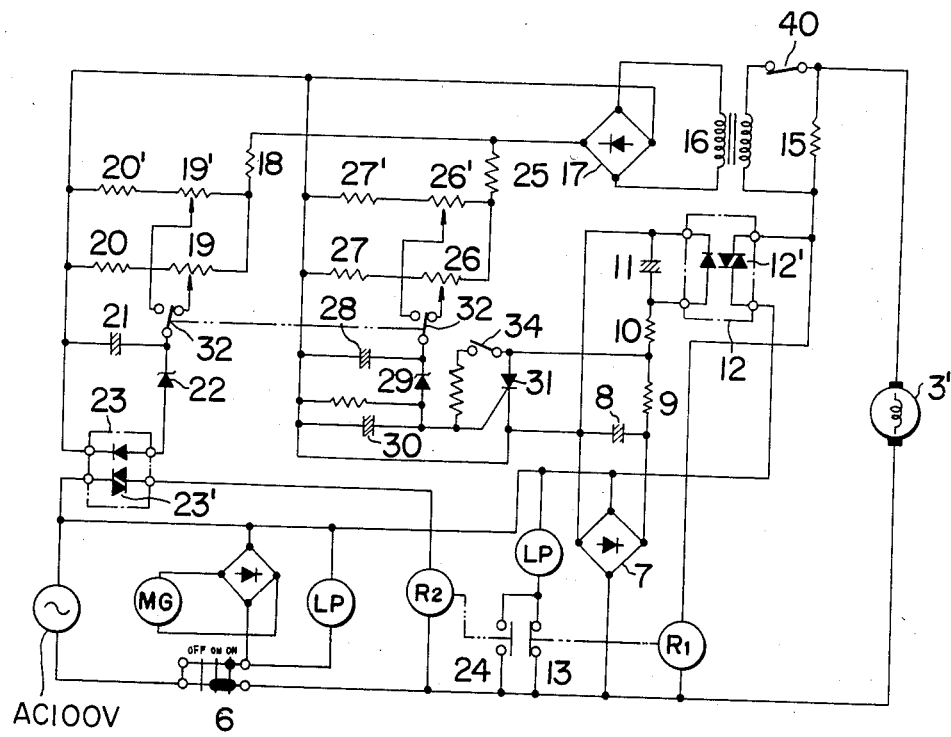
FIG. 3 is a view showing in detail the circuit of the present invention.

FIG. 3 is a view showing in detail one embodiment of the circuit according to the present invention. An a.c. power source portion includes a starting switch 6 which combines a control switch for the electromagnetic base 2 with a control switch for the electric drill 3. A starting and stopping circuit for the electric drill 3 is arranged as follows.

The starting and stopping circuit for the electric drill 3, includes a full-wave rectification 7 for the full-wave rectification of an a.c. voltage from the power source. A smoothing circuit is provided which is connected to the output side of the rectifier 7 and consists of a capacitor 8, resistors 9 and 10 and a capacitor 11, and a first d.c. relay 12 connected to the output side of the smoothing circuit. Upon actuation of the relay 12, an a.c. circuit is closed at the contact of the relay 12 so that the motor 3' for the electric drill 3 is driven.

An alarm circuit for notifying the operator of an increase in the load applied on the electric drill 3, includes an alarm means having a first a.c. relay $R_1$ driven through a contact 12' of the first d.c. relay 12 when the contact 12' is closed, and an emergency alarm lamp LP connected in series with a B-type contact 13 of the a.c. relay $R_1$ and sensor means including a resistor 15 connected in series with the motor 3' for driving the electric drill 3, a transformer 16 and a full-wave rectifier 17. The sensor means detects the terminal voltage of the resistor 15, which is divided by resistors 18, 19 and 20, and applied across a capacitor 21 on a second d.c. relay 23 via a first diode 22. When the terminal voltage of the resistor 15 reaches a voltage corresponding to the first reference level that coincides with the lower load predetermined with respect to the electric drill 3, the first diode 22 is put in the ON state, so that the second d.c. relay 23 is driven with its contact 23' being closed, while the second a.c. relay $R_2$ is driven. The power circuit of the emergency alarm lamp LP is then closed by the A type contact 24 of the relay $R_2$ to send out a visual warning to the operator.

The full-wave rectifier 17 is provided on its output side with voltage-dividing resistors 25, 26 and 27, a capacitor 28 and a second diode 29. The gate of a silicon-controlled element 31 is provided at one terminal of a capacitor 30 coupled to the output of a group of such control elements, and the cathode of the silicon-controlled element 31 is coupled to the other terminal of the capacitor 30, while the anode thereof is coupled to the junction of the resistors 9 and 10 of the said smoothing circuit. When the terminal voltage of the resistor 15 reaches the predetermined value corresponding to the second reference level higher than the first reference level, the diode 29 and the silicon-controlled element 31 are placed in the ON state and the input of the first d.c. relay 12 is short-circuited with its contact 12' being opened, whereby the drill-driving motor 3' is shut off.

A change-over switch 32 is adapted to determine a reference load level which varies depending upon the diameter of the annular cutter used with the drilling machine. When the voltage from variable resistors 19 and 19' increases owing to an increase in load with the result that the voltage impressed upon the capacitor 21 exceeds the zener voltage of the constant-voltage diode 22, the diode 22 is placed in the ON state, and current flows through the d.c. relay 23 with its contact 23' being closed. Subsequent actuation of the second a.c. relay $R_2$ causes closing of the contact 24 of the relay $R_2$ that is normally in the OFF state, so that the power circuit of the emergency alarm lamp LP is closed. Since the reference load level can be varied by fine adjustment of the variable resistors 19 and 19', as many as 10 or more types of annular cutters having varying diameters can be used with the drilling machine according to the present invention.

It is noted that the change-over switch 32 may be a two-way switch designed to be used for the detection of the cutting resistance of the annular cutter 5, that exceeds the second reference level.

It is understood that the emergency alarm lamp LP may be substituted with a suitable aural alarm device such as a buzzer.

A limit switch 34 is coupled in parallel to the silicon-controlled element 31. The limit switch 34 is fixed in place within the frame 1, facing to a slide plate 35 which is supported on the front of the frame 1 in a vertically slidable manner. A board 36 is operatively associated with the limit switch 34 and fixed by means of a butterfly nut 37 to the inside of the slide plate 35 in a vertically adjustable manner. The board 36 is held at a given position depending upon the thickness of the workpiece. When the annular cutter 5 passes through the workpiece, the board 36 is operatively associated with the limit switch 34 to short-circuit the circuit for the silicon-controlled element 31.

A handle 38 for a power switch 6, and a switch 40 for converting from automatic operation to manual operation are provided.

The foregoing embodiment operates as follows.

When the power switch 6 is turned on, the a.c. voltage of the a.c. power source is impressed on the full-wave rectifier 7, and the thus full-wave rectified d.c. voltage is impressed on the coil of the first d.c. relay 12 via the smoothing circuit comprising the capacitor 8, the resistor 9 coupled in series to the resistor 10 and the capacitor 11, so that the relay 12 is acutated with its contact 12' being closed, i.e., in the ON state. On the other hand, the a.c. voltage is also impressed on the driving motor 3' so as to cause rotation of the drill 3 and, at the same time, impressed on the first a.c. relay $R_1$ so that its contact 13 is in the OFF state.

In drilling, the electric drill 3 is allowed to descend gradually by clockwise turning of the manual handle 4. If a load applied on the electric drill is below the predetermined reference level, drilling then proceeds with no difficulty. For instance, when the cutting edge of the annular cutter 5 is clogged with shavings, or as drilling proceeds further, a load on the annular cutter 5 is so large that it exceeds the reference level. The present invention is designed to detect such a large load to control the operation.

When an increase in the cutting resistance of the annular cutter 5 causes an increase in the load on the driving motor 3', there is an increase in current through the motor 3'. A change at this time, i.e., an increase in current, is detected as a voltage change by the resistor 15 coupled in series to the driving motor 3'. A potential difference across the resistor 15 is then increased. Such a potential difference is boosted by the transformer 16, and converted into a d.c. voltage full-wave rectified at 17.

Now assume the change-over switch 32 is located as shown in FIG. 3. The d.c. voltage passes through the resistor 18, and a signal voltage proportionally distributed by the variable resistor 19 is charged in the capacitor 21.

When the signal voltage increases to the charged voltage above the zener voltage, current flows through the constant-voltage diode 22, and signal current is applied on the relay 23 with its contact 23' being closed. As a consequence, a.c. current flows through the relay $R_2$ with its contact 24 being closed, so that the power circuit for the alarm lamp LP is closed. The lamp LP goes on, notifying the operator that a load is impressed on the annular cutter 5.

If the alarm lamp LP goes on, the manual feed handle 4 is turned counterclockwise to ascend the electric drill 3, thereby taking the load off. If the annular cutter 5 is then found to be clogged with shavings, the drill 3 is shut off by manipulation of the switch 6 for removal of shavings. The load on the electric drill 3 is reduced by a series of operations as mentioned above. Thus, when the voltage on the constant-voltage diode 23 drops below the zener voltage in restarting, the voltage on the relay 23 is reduced to zero with its contact 23' returning to the original state, and the contact 24 of the relay $R_2$ again opening the power circuit of the emergency alarm lamp LP. The manual feed handle 4 is then turned clockwise to move the electric drill 3 toward the workpiece for drilling with the annular cutter 5.

When, in the foregoing process, the feed of the electric drill 3 is shut off without identification of clogging of the drilling cutter 5 with shavings, no reduction in the load on the drill 3 takes place. In this case, the signal current boosted at 16 and full-wave rectified at 17 flows through the resistor 25 and the variable resistor 26, and the signal voltage larger than the voltage drawn out of the variable resistor 19 is proportionally distributed and charged in the capacitor 28.

When the signal voltage increases with increases in load and exceeds the zener voltage of the constant-voltage diode 29, it is applied through the diode 29 on the gate of the silicon-controlled element 31. The results is that the element 31 is held in conduction.

The anode of the silicon-controlled element 31 is connected between the resistors 9 and 10 forming the smoothing circuit for the full-wave rectifier 17, while the cathode thereof is connected to one side of the capacitor 30. Thus, when a voltage is applied on the gate of the element 31 to hold it in conduction, the input side of the first d.c. relay 12 is short-circuited with its contact 12' being opened, so that the power circuit is opened to shut the driving motor 3' off. At the same time, current flows through the first a.c. relay $R_1$ with its contact 13 being in the ON state, and the emergency alarm lamp 33 goes on.

If the driving motor 3' is shut off so that the emergency alarm lamp 33 becomes lit, the electric drill 3 is ascended by counterclockwise turning of the handle 4, and the power circuit for the electric drill 3 is turned off by manipulation of the starting switch 6 to put the silicon-controlled element 31 in a nonconduction state, followed by removal of shavings. This causes the electric drill 3 to return to the state-before-operation or the initial operation state for removal of the load. Thereafter, drilling is effected under a torque lower than the reference level. Drilling is stopped when the end of the annular cutter 5 protrudes from the underside of the workpiece. To this end, the contact of the limit switch 34 is closed by the board 36 operatively associated with the slide plate 35 which has descended with the electric drill 3. As a consequence, the circuit for the silicon-controlled element 31 is short-circuited so that a potential difference across the first d.c. relay 23 is removed. The relay contact 12' is then in the OFF state, and the drill-driving motor 3' is automatically shut off in the same manner as in the case that the load on the electric drill 3 exceeds the predetermined value. In this way drilling is finished.

To move the drilling machine to another place after the completion of drilling, the electric drill 3 is ascended by counterclockwise turning of the manual handle 4 until the annular cutter disengages from the workpiece. Subsequently, all the contacts of the switch 6 are opened by manipulation of the handle 38, and the electromagnetic base 2 attached to the lower portion of the frame 1 is demagnetized. Thus, the drilling machine according to the present invention is carried to any desired place at discretion.

As mentioned above, the present invention provides a drilling machine including an electric drill 3 adapted to be fixed at a desired angle with respect to a workpiece and a manual feed handle 4 adapted to move said electric drill toward and away from said workpiece, wherein the control circuit for said electric drill comprises sensor x means for detecting a load applied on said electric drill, alarm means for sending out a signal when a load signal exceeding a first reference level is detected, and switch means 12 for breaking the power circuit for said electric drill when a load signal exceeding a second reference level is detected.

With this novel drilling machine, the alarm means 33 notifies the operator of overloading when such overloading is applied on the electric drill 3 during use. Furthermore, the drilling machine is automatically shut off under such overloading, thus preventing breakage of a cutter or twist drill and burning-out of a drill-driving motor. The drilling machine according to the present invention also protects many types of annular cutters or twist drills having different diameters against breakage and burning-out, since the detection of signal voltage can be effected by the variable resistors 19 (19'), 26 (26') and change-over switches 32 (32) in a nonstepwise manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A portable drilling machine detachably and magnetically fixed to a huge mass of workpiece comprising in combination:

a frame;

an electric drill mounted on said frame in a linearly movable manner and having an electric driving motor;

an electromagnetic base integrally attached to a lower portion of said frame for fixing the same to said huge mass of workpiece;

a starting switch which combines a control switch of said electromagnetic base with a control switch for said electric drill;

a manual feed handle for moving said electric drill toward and away from said huge mass of workpiece;

a control circuit for said electric drill;

sensor means operatively connected in said control circuit for detecting a load applied on said electric drill, and including a resistor coupled in series to said electric motor and a transformer, said resistor being operatively connected in parallel to a voltage rectifier;

alarm means being operatively connected in said control circuit for sending out a signal when a load signal exceeding a first reference level is detected; and switch means being operatively connected in said control circuit for deenergizing said control circuit for said electric drill when a load signal exceeding a second reference level is detected; wherein an increase in load on said electric driving motor increases the current through said electric motor which current increases a potential difference across said resistor, an increase in said potential difference being boosted by said transformer and converted into a d.c. voltage by said rectifier, said voltage being operatively connected to a second resistor to produce a signal voltage proportionally distributed by a variable resistor being operatively connected to a first capacitor, said signal voltage above said first reference level flows through a constant-voltage diode to activate said alarm means.

2. A drilling machine according to claim 1, wherein said control circuit is operatively connected to a power source through a smoothing circuit including a capacitor and resistor coupled in series to a second resistor and capacitor and being operatively connected to a relay having a closed contact for operatively connecting said power source to said electric drill.

3. A drilling machine according to claim 1, wherein a load applied to said electric motor above said second reference level produces an increased signal voltage applied to a second constant-voltage diode to deactivate said electric motor.

4. A drilling machine according to claim 1, and further including at least one variable resistor operatively connected to said signal voltage to vary the reference level of said signal voltage as a function of the diameter of an annular cutter operatively connected to said electric drill.

5. A drilling machine according to claim 1, and further including a limit switch operatively connected to said control circuit and positioned in the path of said movable electric drill to deenergize said electric drill upon completion of a drilling operation.

* * * * *